United States Patent
Hopp

[11] 3,762,729
[45] Oct. 2, 1973

[54] SEALING RINGS
[75] Inventor: Helmut Hopp, Hamburg, Germany
[73] Assignee: Asbest- und Gummiwerke Martin Merkee KG, Hamburg, Germany
[22] Filed: Feb. 11, 1972
[21] Appl. No.: 225,504

[52] U.S. Cl. ............................................. 277/233
[51] Int. Cl. ........................................... F16j 15/20
[58] Field of Search ................. 277/205, 227, 233, 277/212, 206, 206.1, 188, 189

[56] References Cited
UNITED STATES PATENTS
2,639,198  5/1953  Kirkham .................... 277/205 X Primary Examiner—George E. Lowrance
Assistant Examiner—Robert L. Smith
Attorney—John Lezdey

[57] ABSTRACT

A solid sealing ring for sealing parts that move in a traverse way to the ring surface which comprise a ring formed of an endless cross-sectional area, said ring having a plurality of elastomeric sections which radially covers the entire cross-section and an elastomerized fabric section connecting said elastomeric sections.

6 Claims, 3 Drawing Figures

SEALING RINGS

This invention relates to a solid sealing ring for sealing parts without lips and without collar that moves in a transverse way to the ring surface, for example to a piston rod seal. It is known that these sealing rings are manufactured in different cross sections, as closed rings, either from rubber or from rubberized fabric. All parts which consist of all rubber adapt to the static sealing area under initial preload and/or pressure. They are mainly used for the proper seal effect. The rubberized fabric has a special shape which stabilizes the ring itself. The rubberized fabric ring will adapt occasionally to the moving part. The surface friction is small due to the lubrication nicks of the rubberized fabric structure and has a longer life time. These seals are called compact seals, differing from lip ring seals as disclosed in the technical journal "Fluid," May 1969, page 40, FIG. 2.

These compact seals normally consist of only one caoutchouc elastic material which adapts to the sealing area. It usuallly has a ring-shaped enclosed edge which gives a better sealing effect. There has been known a seal which had several caoutchouc elastic sealing edges axial in one line in order to achieve a better sealing effect. The cross section was designed either in a sawtooth or in a gentle wave shape. A better sealing effect will be achieved by this type, but several sealing edges which have a rather long caoutchouc elastic sealing part cannot easily be lubricated and will wear out sooner.

It is an object of this invention to provide solid sealing rings with longer wear.

It is a further object of this invention to provide solid sealing rings with better sealing ability.

The present invention was based on the design of a compact seal which has the described advantages with a better sealing effect and a longer life time. The problem was solved by having several all rubber sections which cover radially the whole cross section and are linked by rubberized fabric sections. It is obvious that this design has a splendid sealing effect and a good lubrication because of the rubberized fabric. These are real advantages compared with the prior seal.

The rubberized fabric areas shall be strong enough to support the caoutchouc areas. The rubberized fabric areas should cover radially the whole cross section. The seal will have an axial total cross section of the caoutchouc and rubberized fabric material, arranged in layers and vulcanized to a solid seal.

The surfaces of the rubberized fabric areas have no contact with the sealing area. On the contrary the caoutchouc areas should adapt radially to both metal parts. The contact area should have a sealing edge like a chevron. A chevron shape guarantees a contact with the metal parts because of their initial preload although there is no pressure involved. When pressure arises, the seal will be compressed axially and the caoutchouc elastic areas will expand radially according to the pressure involved.

If desired, the caoutchouc areas need not contact the sealing area when no pressure is involved. There can be used a sealing element with an initial preload at the pressure side. This element can be connected with the described compact seal or it can be used separately. This seal element has to give the axial pressure preload to the compact seal and will expand radially the caoutchouc elastic areas. They will contact the sealing areas. Although these described rings have no sealing lips and/or intermediate rings, they may be designed with sealing lips and/or intermediate rings.

When the rubberized fabric areas does not contact the sealing areas as described, there will be peripheral areas which are filled with lubricating liquids. Therefore, the caoutchouc elastic areas will not run dry. According to the invention, there may be used such materials and/or sizes and/or constructions of the rubberized fabric areas that may contact the metal areas when the maximum pressure range is involved. This design will give a support and sealing effect to the caoutchouc areas at the maximum pressure range, whereas the seal is still sufficiently lubricated. On the other hand there is less friction at the low pressure range, because the rubberized fabric areas do not contact the metal parts.

It is understood that when the caoutchouc is mentioned, it means that there is included all elastomers which chemically are not really caoutchouc, but which have similar properties. Rubberized fabrics are known as fabric material impregnated with caoutchouc. This rubberized fabric may be pressed and vulcanized which stabilizes the material itself. These characteristic properties can be modified by the structure of the fabric as well as by the proportion of the fabric and the caoutchouc volume. This material is of good applicability because of the stability required and of its surface structure with its ability for lubrication. There can be used other materials instead which have similar properties. When surface lubrication of the rubberized fabric is not required, there can be used such rings, connected with the caoutchouc areas, which have a smooth or self-lubricating surface.

DESCRIPTION OF THE PREFERRED EMBODIMENTS

Figure 1:
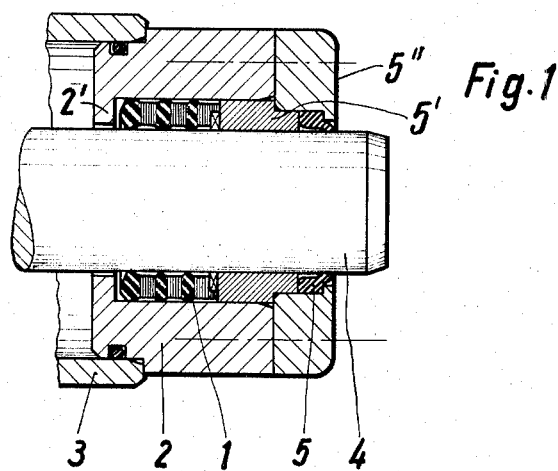
FIG. 1 is a sectional view through an arrangement of a piston rod seal according to this invention.

The compact seal 1 in FIG. 1 is installed in a housing 2 which belongs to a cylinder 3 and this seal is disposed around a reciprocating piston rod 4. A dirt wiper 5, which encircles the rod and is arranged to lie between cap 5'' and guide ring 5', protects the guide ring, seal, rod and cylinder against entry of foreign matter.

As can be seen seal 1 abuts at one side against guide ring 5' and the other side of the seal lies adjacent flange 2' on housing 2. This flange encircles rod 4 but in spaced relationship thereto so that portion 6 of this seal is exposed to the pressure of fluid with the cylinder.

Figure 2:
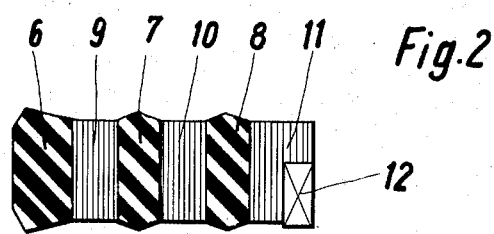
FIG. 2 shows a radial partial cross sectional view in a larger scale of the seal.

As seen in FIG. 2 the seal consists of caoutchouc areas 6, 7 and 8 and rubberized fabric areas 9, 10 and 11. Additionally, there can be used a back ring 12. The caoutchouc area 6 at the pressure side has an initial preload so that it is pressed against housing 2 and rod 4. This caoutchouc area 6 reacts when there is an increase in the fluid pressure in the cylinder to compress the seal axially against guide ring 5'.

The rubberized fabric areas 9 and 10 have a rectangular cross section and the inner and outer radial areas do not contact the sealing area on the housing and rod when there is no fluid pressure involved on the other hand the caoutchouc areas may be a little smaller in the inner diameter and a little larger in the outer diameter so that they will contact the housing and rod by preload or at least almost contact these parts. When there is a pressure rises, the caoutchouc area 6 will compress the seal axially and will give the sealing areas the required preload.

In connection with this invention it is noted that the function will not differ much from the described seal when the ring 5' has the described shape only on the moving side. The rubberized fabric need not cover the whole cross section. The static side at the ring 5' may be designed in caoutchouc material exclusively and in the technically well-known way.

Figure 3:
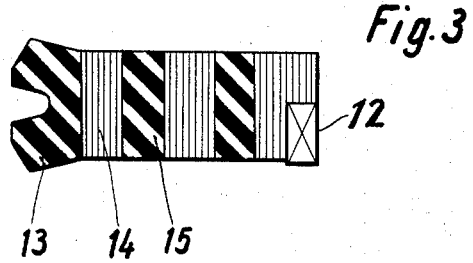
FIG. 3 shows a cross section of another design according to this invention.

The caoutchouc areas need not have a larger cross section. The desired advantage will also be obtained if the surface of the seal on its inner and/or outer diameter is uniform in the total area. This embodiment is seen in FIG. 3 where the caoutchouc areas will be compressed under the influence of a pressure rise in the fluid in cylinder 3 where the caoutchouc areas are shown at 13 and 15 and the rubberized fabric area at 14 so that these rubber areas are pressed in sealing engagement against housing 2 and rod 4. This invention allows a certain wear by steady sealing effect because the caoutchouc areas will still seal if the rubber is already slightly worn out. The sealing rings with the same diameter of the rubberized fabric and the rubber areas have the advantage of being manufactured by simpler molding than seals with parts or areas of different diameters.

The caoutchouc area 6 in the embodiment of the seal shown in FIG. 2 has no lips. However, the design can naturally have sealing lips which contact the sealing area by its initial preload and will expand by rising pressure.

Obviously, the embodiments shown are exemplary only and a wide variety of embodiments may be devised without departing from the spirit and scope thereof.

I claim:

1. A sealing ring for disposition between first and second parts which are movable relative to each other, in the direction of the longitudinal axis of the ring, in response to the application of fluid pressure to the first part, the sealing ring being disposed to encircle the essentially outer cylindrical surface of the first part and being in turn encircled within an essentially cylindrical surface of the second part, the sealing ring being disposed in the second part to have a first end face in abutment with a fixed surface of the second part and with the other end face in an area receiving the fluid applied to the first part, the sealing ring comprising a plurality of alternating rings of elastomeric and rubberized fabric material arranged in side by side relationship along the longitudinal length of the sealing ring, the outer diameters of each of said elastomeric rings being such that each of said elastomeric rings is in sealing engagement with the outer cylindrical surface of the first part and with the cylindrical surface of the second part even in the absence of a fluid pressure within the area adjacent the other end face of the sealing ring, the outer diameters of each of the rubberized fabric rings being less than that of the elastomeric rings, whereby when fluid pressure is received in the area adjacent the other end face the composite ring is axially compressed and said elastomeric rings are pressed into more intimate sealing engagement with the first and second parts along the cylindrical surfaces thereof.

2. An arrangement as defined in claim 1, wherein the outer and inner peripheral surfaces of said elastomeric rings are chevron shaped.

3. An arrangement as defined in claim 1, wherein the outer and inner peripheral surfaces of said rubberized fabric rings are each of uniform dimensions across the cross-section of each of rubberized fabric rings.

4. An arrangement as defined in claim 3, wherein the outer and inner peripheral surfaces of said rubberized fabric rings are radially spaced from the second and first parts respectively.

5. An arrangement as defined in claim 4, wherein said rubberized fabric rings are rectangular in cross-section.

6. An arrangement as defined in claim 1, wherein said elastomeric and said rubberized fabric rings are both rectangular in cross-section.

* * * * *